(12) United States Patent
Guan et al.

(10) Patent No.: US 12,002,947 B2
(45) Date of Patent: Jun. 4, 2024

(54) ELECTRODE ACTIVE COMPOSITION, PREPARATION METHOD THEREOF, ELECTRODE, BATTERY, AND APPARATUS

(71) Applicant: CONTEMPORARY AMPEREX TECHNOLOGY CO., LIMITED, Ningde (CN)

(72) Inventors: Yingjie Guan, Ningde (CN); Yongchao Liu, Ningde (CN); Qisen Huang, Ningde (CN); Na Liu, Ningde (CN); Chengdu Liang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/109,812

(22) Filed: Feb. 14, 2023

(65) Prior Publication Data
US 2023/0207782 A1 Jun. 29, 2023

Related U.S. Application Data

(63) Continuation of application No. PCT/CN2020/114539, filed on Sep. 10, 2020.

(51) Int. Cl.
*H01M 4/36* (2006.01)
*H01M 4/04* (2006.01)
(Continued)

(52) U.S. Cl.
CPC ......... *H01M 4/364* (2013.01); *H01M 4/0471* (2013.01); *H01M 4/485* (2013.01);
(Continued)

(58) Field of Classification Search
None
See application file for complete search history.

(56) References Cited

U.S. PATENT DOCUMENTS

2012/0258365 A1* 10/2012 Yokoyama ............. C01G 51/42
429/223
2013/0052535 A1* 2/2013 Yanagihara ......... H01M 4/5825
977/773
(Continued)

FOREIGN PATENT DOCUMENTS

CA       2210459 A1    9/1996
CN     101894974 A    11/2010
(Continued)

OTHER PUBLICATIONS

Contemporary Amperex Technology Co., Limited, International Search Report and Written Opinion, PCT/CN2020/114539, dated Jun. 18, 2021, 12 pgs.
(Continued)

*Primary Examiner* — Tracy M Dove
(74) *Attorney, Agent, or Firm* — Kilpatrick Townsend & Stockton LLP

(57) ABSTRACT

This application relates to an electrode active composition, a preparation method thereof, an electrode, a battery, and an apparatus. The electrode active composition includes: a first component, the first component being lithium cobalt oxide particles; and a second component, the second component being ternary material particles. The first component includes lithium cobalt oxide particles with a particle size greater than 11 μm and lithium cobalt oxide particles with a particle size less than 6 μm, and a ratio in number of the lithium cobalt oxide particles with a particle size greater than 11 μm to the lithium cobalt oxide particles with a particle size less than 6 μm is 0.2-4.8, and in some embodiments, 0.2-2.8. A summed number of the lithium cobalt oxide particles with a particle size greater than 11 μm and the lithium cobalt oxide particles with a particle size less than 6

(Continued)

µm accounts for above 90% of a total number of particles in the first component.

19 Claims, 7 Drawing Sheets

(51) Int. Cl.
  *H01M 4/485*  (2010.01)
  *H01M 4/505*  (2010.01)
  *H01M 4/525*  (2010.01)
  *H01M 4/62*  (2006.01)
  *H01M 4/02*  (2006.01)

(52) U.S. Cl.
  CPC ........... *H01M 4/505* (2013.01); *H01M 4/525* (2013.01); *H01M 4/621* (2013.01); *H01M 2004/021* (2013.01)

(56) References Cited

U.S. PATENT DOCUMENTS

| | | |
|---|---|---|
| 2018/0287202 A1 | 10/2018 | Matsushita et al. |
| 2019/0359497 A1* | 11/2019 | Ma ........................ H01M 4/505 |
| 2020/0006766 A1* | 1/2020 | Wu .................... H01M 10/0525 |

FOREIGN PATENT DOCUMENTS

| | | |
|---|---|---|
| CN | 102447107 A | 5/2012 |
| CN | 104756300 A | 7/2015 |
| CN | 104919630 A | 9/2015 |
| CN | 103022499 B | 9/2016 |
| CN | 106797029 A | 5/2017 |
| CN | 106848183 A | 6/2017 |
| CN | 107785542 A | 3/2018 |
| CN | 107799763 A | 3/2018 |
| CN | 108431998 A | 8/2018 |
| CN | 110034276 A | 7/2019 |
| CN | 110224117 A | 9/2019 |
| CN | 110857224 A | 3/2020 |
| CN | 111354938 B | 9/2020 |
| JP | 2007265731 A | 10/2007 |
| KR | 1020200022904 A | 3/2020 |
| WO | 2016053056 A1 | 4/2016 |

OTHER PUBLICATIONS

Contemporary Amperex Technology Co., Limited, Extended European Search Report, EP20952779.5, dated Feb. 21, 2023, 9 pgs.
Richard Hogg, "Issues in Particle Size Analysis," Kona Power and Particle Journal, vol. 26, Jan. 1, 2008, pp. 81-93, XP093004777, JP ISSN: 0288-4534, DOI: 10.14356/KONA.2008009, 13 pgs.
The notice of first examination opinion report received in the corresponding Chinese application 202080102699.6, mailed Apr. 18, 2024.

* cited by examiner

ELECTRODE ACTIVE COMPOSITION, PREPARATION METHOD THEREOF, ELECTRODE, BATTERY, AND APPARATUS

CROSS-REFERENCE TO RELATION APPLICATION

This application is a continuation application of PCT Patent Application No. PCT/CN2020/114539, entitled "ELECTRODE ACTIVE COMPOSITION AND PREPARATION METHOD THEREOF, ELECTRODE, BATTERY AND APPARATUS" filed on Sep. 10, 2020, which is incorporated herein by reference in its entirety.

TECHNICAL FIELD

This application relates to the technical field of lithium secondary batteries, and in particular, to an electrode active composition, a preparation method thereof, an electrode, a battery, and an apparatus.

BACKGROUND

Since the first commercialization, rechargeable lithium-ion batteries have been widely used in various portable electronic products as well as in large electric vehicles and energy storage grids.

Positive electrode active materials for lithium-ion batteries usually include lithium cobalt oxide (LCO), lithium manganese oxide (LMO), lithium iron phosphate (LFP), lithium nickel cobalt aluminum oxide (NCA), lithium nickel manganese cobalt oxide (NMC), and the like. Lithium ions can be reversibly intercalated into and deintercalated from such positive electrode materials.

However, electrode active materials with better performance are still in need in the field.

SUMMARY

This disclosure provides a new electrode active composition. The electrode active composition is applied to a battery, and performance of the battery can be improved.

According to some aspects, an electrode active composition is provided and includes:

a first component, the first component being lithium cobalt oxide particles; and a second component, the second component being ternary material particles;

where the first component includes lithium cobalt oxide particles with a particle size greater than 11 μm and lithium cobalt oxide particles with a particle size less than 6 μm, and a ratio in number of the lithium cobalt oxide particles with a particle size greater than 11 μm to the lithium cobalt oxide particles with a particle size less than 6 μm is 0.2-4.8, and optionally 0.2-2.8; and a summed number of the lithium cobalt oxide particles with a particle size greater than 11 μm and the lithium cobalt oxide particles with a particle size less than 6 μm accounts for above 90% of a total number of particles in the first component.

In some embodiments, a particle size of a particle is measured through observation by using a scanning electron microscope.

In some embodiments, the particle size of the particle is defined by using the following method: observing the particle by using the scanning electron microscope, and using a diameter of a circumcircle of a particle image as the particle size of the particle.

In some embodiments, a ratio in number of the lithium cobalt oxide particles with a particle size greater than 11 μm to the lithium cobalt oxide particles with a particle size less than 6 μm is measured by using the following method:

preparing an electrode plate from the electrode active composition;

cutting the electrode plate to obtain a neat section (the section is perpendicular to a surface of the electrode plate);

analyzing a preset region of the section by using the scanning electron microscope equipped with an energy dispersive spectrometer;

analyzing compositions of the particles in the preset region, to locate all the lithium cobalt oxide particles in the preset region and measure a particle size of each lithium cobalt oxide particle; and calculating the ratio in number of the lithium cobalt oxide particles with a particle size greater than 11 μm to the lithium cobalt oxide particles with a particle size less than 6 μm based on a measurement result.

In some embodiments, the ratio in number of the lithium cobalt oxide particles with a particle size greater than 11 μm to the lithium cobalt oxide particles with a particle size less than 6 μm is 0.2-0.3, 0.3-0.4, 0.4-0.5, 0.5-0.6, 0.6-0.7, 0.7-0.8, 0.8-0.9, 0.9-1.0, 1.0-1.1, 1.1-1.2, 1.2-1.3, 1.3-1.4, 1.4-1.5, 1.5-1.6, 1.6-1.7, 1.7-1.8, 1.8-1.9, 1.9-2.0, 2.0-2.1, 2.1-2.2, 2.2-2.3, 2.3-2.4, 2.4-2.5, 2.5-2.6, 2.6-2.7, 2.7-2.8, 2.8-2.9, 2.9-3.0, 3.0-3.1, 3.1-3.2, 3.2-3.3, 3.3-3.4, 3.4-3.5, 3.5-3.6, 3.6-3.7, 3.7-3.8, 3.8-3.0, 3.9-4.0, 4.0-4.1, 4.1-4.2, 4.2-4.3, 4.3-4.4, 4.4-4.5, 4.5-4.6, 4.6-4.7, or 4.7-4.8. In some embodiments, the ratio in number of the lithium cobalt oxide particles with a particle size greater than 11 μm to the lithium cobalt oxide particles with a particle size less than 6 μm is 0.2-2.8, and further optionally 0.5-2.8 or 0.7-1.8.

In some embodiments, a weight ratio of the first component to the second component is 1-9:1, for example, 1.5-4:1, 1.2-2:1, 2-3:1, 3-4:1, 4-5:1, 5-6:1, 6-7:1, 7-8:1, or 8-9:1.

In some embodiments, a particle size of the ternary material particle is 2 μm-6 μm, for example, 3 μm-5 μm.

In some embodiments, the lithium cobalt oxide particle has a single crystal structure.

In some embodiments, the ternary material particle has at least a single crystal structure. In some embodiments, the ternary material particle may further include a particle with a polycrystalline structure.

In some embodiments, a chemical formula of the lithium cobalt oxide is $Li_xCo_yM^1_{(1-y)}O_2$, where $0.95 \leq x \leq 1.05$, $0.8 \leq y \leq 1$, and $M^1$ is selected from a combination of one or more of Zr, Mg, Ti, Sr, W, Nb, Al, P, F, and S.

In some embodiments, the ternary material is selected from lithium nickel manganese cobalt oxide or lithium nickel cobalt aluminum oxide.

In some embodiments, a chemical formula of the lithium nickel manganese cobalt oxide is $Li_aNi_bCo_cMn_dM^2_{(1-b-c-d)}O_2$, where $0.5 \leq a \leq 1.2$, $0.65 \leq b \leq 1$, $0 \leq c \leq 0.35$, $0 \leq d \leq 0.35$, and $M^2$ is selected from a combination of one or more of Zr, Zn, Ti, Sr, Sb, Y, W, Al, B, P, F, and S.

In some embodiments, a=0.5-0.6, 0.6-0.7, 0.7-0.8, 0.8-0.9, 0.9-1, 1-1.1, or 1.1-1.2.

In some embodiments, b=0.6-0.65, 0.7-0.8, 0.8-0.9, or 0.9-1.

In some embodiments, c=0-0.1, 0.1-0.2, 0.2-0.3, or 0.3-0.35.

In some embodiments, d=0-0.1, 0.1-0.2, 0.2-0.3, or 0.3-0.35.

In some embodiments, a chemical formula of the lithium nickel cobalt aluminum oxide is $Li_xNi_eCo_fAl_gM^3_{(1-e-f-g)}O_2$, $0.5 \leq x \leq 1.2$, $0.5 \leq e \leq 1$, $0 \leq f \leq 0.5$, $0 \leq g \leq 0.5$, and $M^3$ is selected from a combination of one or more of Zr, Mg, Ba, Ti, Sr, Sb, Y, W, and B.

In some embodiments, x=0.5-0.6, 0.6-0.7, 0.7-0.8, 0.8-0.9, 0.9-1, 1-1.1, or 1.1-1.2.

In some embodiments, e=0.5-0.6, 0.6-0.7, 0.7-0.8, 0.8-0.9, or 0.9-1.

In some embodiments, f=0-0.1, 0.1-0.2, 0.2-0.3, 0.3-0.4, or 0.4-0.5.

In some embodiments, g=0-0.1, 0.1-0.2, 0.2-0.3, 0.3-0.4, or 0.4-0.5.

In some embodiments, a compacted density of the electrode active composition is $\geq 4.05$ g/cm³, for example, $\geq 4.1$ g/cm³, and for example, 4.05 g/cm³-4.25 g/cm³, where the compacted density is a density of a briquette formed by pressing the electrode active composition for 30 seconds under a pressure of 5 tons.

In some embodiments, the ternary material particle has a core-coating layer structure.

The core includes the ternary material.

The coating layer is applied to at least partial surface of the core (for example, a partial surface or an entire surface), and the coating layer includes a reaction product of a sulfur-containing compound and a lithium-containing compound, where the reaction product contains element Li, element S, and element O.

In some embodiments, the element S accounts for 40 ppm-5000 ppm in the ternary material particles by weight.

In some embodiments, the coating layer further contains one or more of element B, element F, and element P.

In some embodiments, under a condition of containing the element B, the element B accounts for 500 ppm-3000 ppm in the ternary material particles by weight.

In some embodiments, under a condition of containing the element F, the element F accounts for 200 ppm-1500 ppm in the ternary material particles by weight.

In some embodiments, under a condition of containing the element P, the element P accounts for 500 ppm-3000 ppm in the ternary material particles by weight.

In some embodiments, the lithium-containing compound includes lithium salt.

In some embodiments, the lithium-containing compound includes one or more of the following: $Li_2O$, LiOH, $Li_2CO_3$, $LiNO_3$, $LiPF_6$, lithium oxalate, and lithium acetate.

In some embodiments, the sulfur-containing compound includes one or more of the following: mercaptan, thiophenol, thioether, thioaldehyde, thioketone, thionocarboxylic acid, sulphoxide, sulfone, and sulfur oxoacid, and derivatives thereof.

In some embodiments, the sulfur oxoacid is sulfonic acid, sulfinic acid, or sulfenic acid.

In some embodiments, the derivatives of the sulfur oxoacid include one or more of the following: ester of sulfur oxoacid, salt of sulfur oxoacid (for example, lithium salt of sulfur oxoacid), acyl halide of sulfur oxoacid, acylamide of sulfur oxoacid, and acylamide lithium salt of sulfur oxoacid.

In some embodiments, the sulfur-containing compound includes one or more of the following:
R1-S(=O)₂-R2, R1-C(=S)-R2,

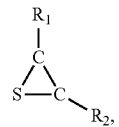

R1-C-S-C-R2, or R1-S(=O)₂-LiN-S(=O)₂-R2, where R1 and R2 are each independently selected from hydroxyl, amino, $C_{1-6}$ alkyl, aryl, a halogen atom (for example, F, Cl, Br, or I), and a hydrogen atom.

In some embodiments, the sulfur-containing compound includes R1-S(=O)₂-R2, where R1 is hydroxyl, and R2 is selected from amino, $C_{1-6}$ alkyl, and a halogen atom (for example, F, Cl, Br, or I).

In some embodiments, the sulfur-containing compound includes R1-C(=S)-R2, where R1 is amino and R2 is $C_{1-6}$ alkyl.

In some embodiments, the sulfur-containing compound includes

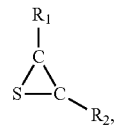

where R1 and R2 each are a hydrogen atom or $C_{1-6}$ alkyl.

In some embodiments, the sulfur-containing compound includes R1-C-S-C-R2, where R1 and R2 each are a hydrogen atom or $C_{1-6}$ alkyl.

In some embodiments, the sulfur-containing compound includes R1-S(=O)₂-LiN-S(=O)₂-R2, where R1 and R2 each are a halogen atom.

In some embodiments, the sulfur-containing compound includes one or more of the following: sulfamide, sulfamic acid, lithium bisfluorosulfonimide, thiopropionamide, thio-isobutyramide, propylene sulfide, and methyl ethyl sulfide.

In some embodiments, the sulfur-containing compound includes one or more of the following:

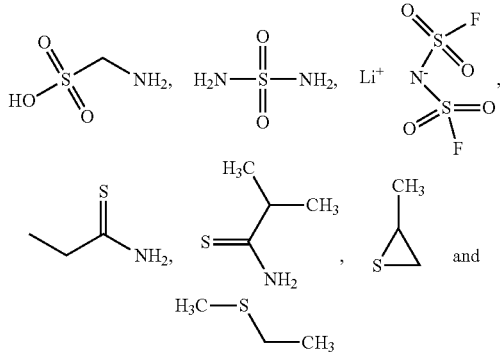

According to some aspects, a preparation method of the electrode active composition according to any one of the foregoing embodiments is provided and includes the following steps:

providing a first component, the first component being lithium cobalt oxide particles;

providing a second component, the second component being ternary material particles; and mixing the first component and the second component;

where the first component includes lithium cobalt oxide particles with a particle size greater than 11 μm and lithium cobalt oxide particles with a particle size less than 6 μm, and a ratio in number of the lithium cobalt oxide particles with a particle size greater than 11 μm to the lithium cobalt oxide particles with a particle size less than 6 μm is 0.2-4.8, and optionally 0.2-2.8; and a summed number of the lithium cobalt oxide particles with a particle size greater than 11 μm and the lithium cobalt oxide particles with a particle size less than 6 μm accounts for above 90% of a total number of particles in the first component.

In some embodiments, the ratio in number of the lithium cobalt oxide particles with a particle size greater than 11 μm to the lithium cobalt oxide particles with a particle size less than 6 μm is 0.2-0.3, 0.3-0.4, 0.4-0.5, 0.5-0.6, 0.6-0.7, 0.7-0.8, 0.8-0.9, 0.9-1.0, 1.0-1.1, 1.1-1.2, 1.2-1.3, 1.3-1.4, 1.4-1.5, 1.5-1.6, 1.6-1.7, 1.7-1.8, 1.8-1.9, 1.9-2.0, 2.0-2.1, 2.1-2.2, 2.2-2.3, 2.3-2.4, 2.4-2.5, 2.5-2.6, 2.6-2.7, 2.7-2.8, 2.8-2.9, 2.9-3.0, 3.0-3.1, 3.1-3.2, 3.2-3.3, 3.3-3.4, 3.4-3.5, 3.5-3.6, 3.6-3.7, 3.7-3.8, 3.8-3.0, 3.9-4.0, 4.0-4.1, 4.1-4.2, 4.2-4.3, 4.3-4.4, 4.4-4.5, 4.5-4.6, 4.6-4.7, or 4.7-4.8. In some embodiments, the ratio in number of the lithium cobalt oxide particles with a particle size greater than 11 μm to the lithium cobalt oxide particles with a particle size less than 6 μm is 0.2-2.8, and further optionally 0.5-2.8 or 0.7-1.8.

In some embodiments, the preparation method of the electrode active composition further includes the following step: mixing first lithium cobalt oxide particles and second lithium cobalt oxide particles to obtain the first component, where a particle size $D_v50$ of the first lithium cobalt oxide particles is 17 μm-21 μm, for example, 18 μm-20 μm, and for example, 19 μm; and a particle size $D_v50$ of the second lithium cobalt oxide particles is 4 μm-8 μm, for example, 5 μm-7 μm, and for example, 6 μm.

In some embodiments, a weight ratio of the first lithium cobalt oxide particles to the second lithium cobalt oxide particles is 3-15:1, for example, 3-7:1, and for example, 3-4:1, 4-5:1, 5-6:1, 6-7:1, 7-8:1, 8-9:1, 9-10:1, 10-11:1, 11-12:1, 12-13:1, 13-14:1, or 14-15:1.

In some embodiments, the ternary material particle has a core-coating layer structure.

The core includes the ternary material.

The coating layer is applied to the core, and the coating layer includes a reaction product of a sulfur-containing compound and a lithium-containing compound, where the reaction product contains element Li, element S. and element O.

In some embodiments, a preparation method of the ternary material particles with a core-coating layer structure includes:

(a) providing a core formation material and a coating layer formation material, where the core formation material includes a ternary material, and the coating layer formation material contains a sulfur-containing compound, where step (a) has one or more of the following features (a1) and (a2):

(a1) a surface of the core formation material contains a lithium-containing compound; and (a2) the coating layer formation material further contains a lithium-containing compound; and (b) using the coating layer formation material to treat the core formation material, to form the reaction product of the sulfur-containing compound and the lithium-containing compound on the surface of the core formation material, where the reaction product contains element Li, element S, and element O.

In some embodiments, in (a1), the lithium-containing compound is an alkaline lithium-containing compound.

In some embodiments, in (a2), the lithium-containing compound is a neutral or acidic lithium-containing compound.

In some embodiments, the operation of using the coating layer formation material to treat the core formation material includes: applying, on the surface of the core formation material, a solution in which the coating layer formation material is dissolved, and then performing heat treatment;

in some embodiments, a temperature of the heat treatment is 80° C.-300° C.; and in some embodiments, the heat treatment lasts for 3 h-20 h.

In some embodiments, the operation of applying, on the surface of the core formation material, a solution in which the coating layer formation material is dissolved includes: dispersing the core formation material in the solution in which the coating layer formation material is dissolved, and then separating the core formation material from the solution.

In some embodiments, a solvent of the solution contains one or more of the following: water, ethanol, and N-methylpyrrolidone.

In some embodiments, the solvent of the solution is alcohol with a concentration of 90 vol %-95 vol %.

In some embodiments, a concentration of the coating layer formation substance contained in the solution is 0.1 mol/L-5 mol/L.

In some embodiments, the lithium-containing compound is as defined as in any one of the foregoing embodiments.

In some embodiments, the sulfur-containing compound is as defined as in any one of the foregoing embodiments.

According to some aspects, an electrode active composition is provided. The electrode active composition is prepared by using the method according to any one of the foregoing embodiments.

According to some aspects, an electrode is provided. The electrode includes the electrode active composition according to any one of the foregoing embodiments.

According to some aspects, a battery is provided. The battery includes the electrode active composition according to any one of the foregoing embodiments.

According to some aspects, an apparatus is provided. The apparatus includes the battery according to any one of the foregoing embodiments, and the battery serves as an energy storage unit of the apparatus.

In some embodiments, the apparatus is an electric apparatus, and the battery is configured to supply power to the electric apparatus.

In some embodiments, a preparation method of an electrode active material with a coating layer is a wet method.

In some embodiments, element Co, element Mn, and element Ni in the electrode active composition may be measured by using an instrument and a method commonly known in the field.

In some embodiments, a percentage of the ternary material (for example, lithium nickel manganese cobalt oxide or lithium nickel cobalt aluminum oxide) in the electrode active composition is measured by the following method: measuring percentages of the element Co, the element Mn (or Al), and the element Ni by using an ICAP-7000 inductively coupled plasma optical emission spectrometer (ICP-OES) from Thermo Fisher Scientific (Thermo Fisher Scientific) of the USA according to the EPA 6010D-2014 Inductively Coupled Plasma Atomic Emission Spectrometry. The specific test method includes the following steps: performing digestion on 0.4 g of positive electrode powder by using 10 mL of aqua regia, after the digestion is completed, transferring an entire digestion solution into a 1000-mL volumetric flask to reach a specific volume, and measuring the percentages of the element Co, the element Mn (or Al), and the element Ni by using the ICAP-7000 ICP-OES. A percentage of the element Co in the lithium nickel manganese cobalt oxide may be calculated based on a proportional relationship of the element Ni and the element Mn (or Al). A percentage of the element Co in the lithium cobalt oxide is obtained by subtracting the calculated percentage of the element Co in the lithium nickel manganese cobalt ternary active substance from the percentage of the element Co measured by using the ICP. A percentage of the lithium nickel manganese cobalt oxide in the electrode active composition may be calculated based on the chemical formula of the lithium cobalt oxide and the chemical formula of the lithium nickel manganese cobalt oxide.

In some embodiments, an electrolyte of the battery may be selected as required. The electrolyte may be selected from at least one of a solid electrolyte and a liquid electrolyte (namely, an electrolyte solution). When the electrolyte is an electrolyte solution, the electrolyte solution includes an electrolyte salt and a solvent. The electrolyte salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroborate), LiFSI (lithium bis(fluorosulfonyl)bisfluorosulfonyl imide), LiTFSI (lithium bis-trifluoromethanesulfonimidetrifluoromethanesulfon imide), LiTFS (lithium trifluoromethanesulfonat), LiDFOB (lithium difluorooxalatoborate), LiBOB (lithium bisoxalatoborate), $LiPO_2F_2$ (lithium difluorophosphate), LiDFOP (lithium difluorophosphate), and LiTFOP (lithium tetrafluoro oxalate phosphate). The solvent may be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfone (MSM), ethyl methyl sulfone (EMS), and diethyl sulfone (ESE).

In some embodiments, the battery further includes a separator. The separator separates a positive electrode and a negative electrode.

In some embodiments, the separator may be any commonly known porous separator with good chemical stability and mechanical stability, for example, one or more of glass fiber, non-woven fabric, polyethylene, polypropylene, and polyvinylidene fluoride. The separator may be a single-layer thin film or a multi-layer composite thin film. When the separator is a multi-layer composite thin film, all its layers may be made of a same material or different materials.

According to some aspects, an apparatus is provided. The apparatus includes the foregoing battery, and the battery serves as an energy storage unit of the apparatus.

In some embodiments, the apparatus is an electric apparatus, and the battery supplies power to the electric apparatus.

In some embodiments, the electric apparatus may be an electric appliance, for example, a household appliance, a commercial appliance, and an industrial appliance.

In some embodiments, the electric apparatus may be an electric transport, for example, an electric vehicle. The electric transport may be driven by battery or driven by hybrid powder.

In some embodiments, "comprising", "including", and "containing" may refer to a percentage greater than 0, for example, above 1%, above 10%, above 20%, above 30%, above 40%, above 50%, above 60%, above 70%, above 80%, above 90%, and 100%. When the percentage is 100%, "comprising", "including", and "containing" means "consisting of".

In some embodiments, % is wt %.

For simplicity, only some numerical ranges are explicitly disclosed herein. However, any lower limit may be combined with any upper limit to form a range not expressly recorded; any lower limit may be combined with any other lower limit to form a range not expressly recorded, and any upper limit may be combined with any other upper limit to form a range not expressly recorded. In addition, although not expressly recorded, each point or individual value between endpoints of a range is included in the range. Therefore, each point or individual value may be used as its own lower limit or upper limit to be combined with any other point or individual value or combined with any other lower limit or upper limit to form a range not expressly recorded.

In the description of this specification, it should be noted that, unless otherwise stated, "more than" and "less than" are inclusive of the present number, and "more" in "one or more" means two or more than two.

The foregoing invention content is not intended to describe each of the disclosed embodiments or implementations of this application. The following description illustrates example embodiments in detail by using examples. Throughout this application, guidance is provided by using a series of embodiments and the embodiments may be used in various combinations. In the examples, enumeration is only representative but should not be interpreted as exhaustive.

Term Interpretation

The following terms, if used in this application, may be understood in a non-limiting manner as follows:

The "electrode active material" is a battery material with a specific composition and a crystal structure for intercalating and deintercalating lithium ions.

The "electrode" is a component that participates in an electrochemical reaction of the battery and that includes the electrode active substance.

The "battery" is a single physical module that includes one or more battery cells for providing a higher voltage and capacity. The battery cell is a battery cell that can be charged and discharged independently. The battery cell structurally includes a positive electrode, a negative electrode, a separator, an electrolyte, an outer package for packaging a positive electrode plate, a negative electrode plate, the separator, and the electrolyte, and the like. The type and shape of the battery cell are not specifically limited in this application. The battery cell may be a soft package battery cell, or may be a cylinder cell, a prismatic cell, or another type of cell.

The battery may include a battery module and a battery pack. The battery module is formed by electrically connecting a specific quantity of battery cells and putting the battery cells into a frame to protect the battery cells from external impact, heat, vibration, and the like. The battery pack is a final state of a battery system assembled in a powerconsuming apparatus such as an electric vehicle. Most existing battery packs are formed by assembling various control and protection systems such as a battery management system and a thermal management part on one or more battery modules. With the development of technologies, the battery module may be omitted, that is, the battery pack is directly formed using battery cells. With this improvement, weight energy density and volumetric energy density of the battery system are improved, and the number of parts is remarkably reduced.

The "single crystal" is also referred to as a single particle or a primary particle, and in terms of micro morphology, the single crystal is a particle that substantially does not agglomerate or disperse. The single crystal may be a particle with an irregular shape.

The "polycrystal" is a secondary particle formed by gathering two or more primary particles. The polycrystal may be a spherical particle.

The terms "powder" and "particle" may be used interchangeably in this specification. These terms further randomly have the following features: hollow, dense, porous, semiporous, coated, uncoated, multi-layer, laminated, simple, complex, dendritic, inorganic, organic, element, non-element, compound, doped, undoped, spherical, non-spherical, surface-functional, non-surface-functional, stoichiometric, and non-stoichiometric forms or substances. In addition, the term "powder" generally includes a one-dimensional material (fiber, tube, or the like), a two-dimensional material (a slice, a thin film, a laminated material, a flat surface, or the like), and a three-dimensional material (a sphere, a cone, an oval, a cylinder, a cube, a homocline, a dumb-bell shape, a hexagon, a truncated icosahedron, an irregular structure, or the like).

The term "sphere" herein is a regular sphere, an ellipsoid, or a sphere-like shape.

The term "particle size $D_v10$" herein is a volume-based particle size at 10 percent; the term "particle size $D_v50$" is a volume-based particle size at 50 percent; and the term "particle size $D_v90$" is a volume-based particle size at 90 percent. The particle size is measured by using a laser diffraction method.

The term "lithium salt" is a lithium-containing compound that can deintercalate lithium ions in a solvent.

The term "mercaptan" is formed by replacing alcoholic hydroxyl in an ethanol molecule with —SH.

The term "thiophenol" is formed by replacing phenolic hydroxyl in a phenol molecule with —SH.

The term "thioether" is a compound with an R3-S—R4 structure, where R3 and R4 each are alkyl.

The term "thioaldehyde" is formed by replacing aldehyde C(O)H in an aldehyde molecule with C(S)H.

The term "thioketone" is formed by replacing carbonyl —C(O)— in a ketone molecule with —C(S)—.

The term "thionocarboxylic acid" is formed by replacing with —COOH in a carboxylic acid molecule with CO—SH, CS—OH, or CSSH.

The term "sulfone" is a compound with —S(O)$_2$R, where R is alkyl, aryl, or heteroaryl.

The term "sulfoxide" is a compound with —S(O)R, where R is alkyl, aryl, or heteroaryl.

The term "sulfonic acid", "sulfinic acid", and "sulfenic acid" are compounds with —S(O)$_2$OH, —S(O)OH, and —SOH respectively.

The term "amino" is substituted or unsubstituted amino. The substituted amino is, for example, alkyl-substituted amino (for example, methyl amino).

The term "$C_{1-6}$ alkyl" is alkyl with 1 to 6 carbon atoms, and may be side-chain or straight-chain, saturated or unsaturated, and unsubstituted or mono/poly-substituted.

Beneficial Effects

One or more technical solutions of this disclosure have one or more of the following beneficial effects.

(1) The electrode active composition has relatively high compacted density.

(2) The electrode active composition is used for a battery, and the battery has higher specific energy, and specifically volumetric specific energy.

(3) The electrode active composition is used for a battery, and the battery has better cycling performance.

(4) The electrode active composition is used for a battery, and the battery has better performance under a relatively high voltage.

Figure 2:
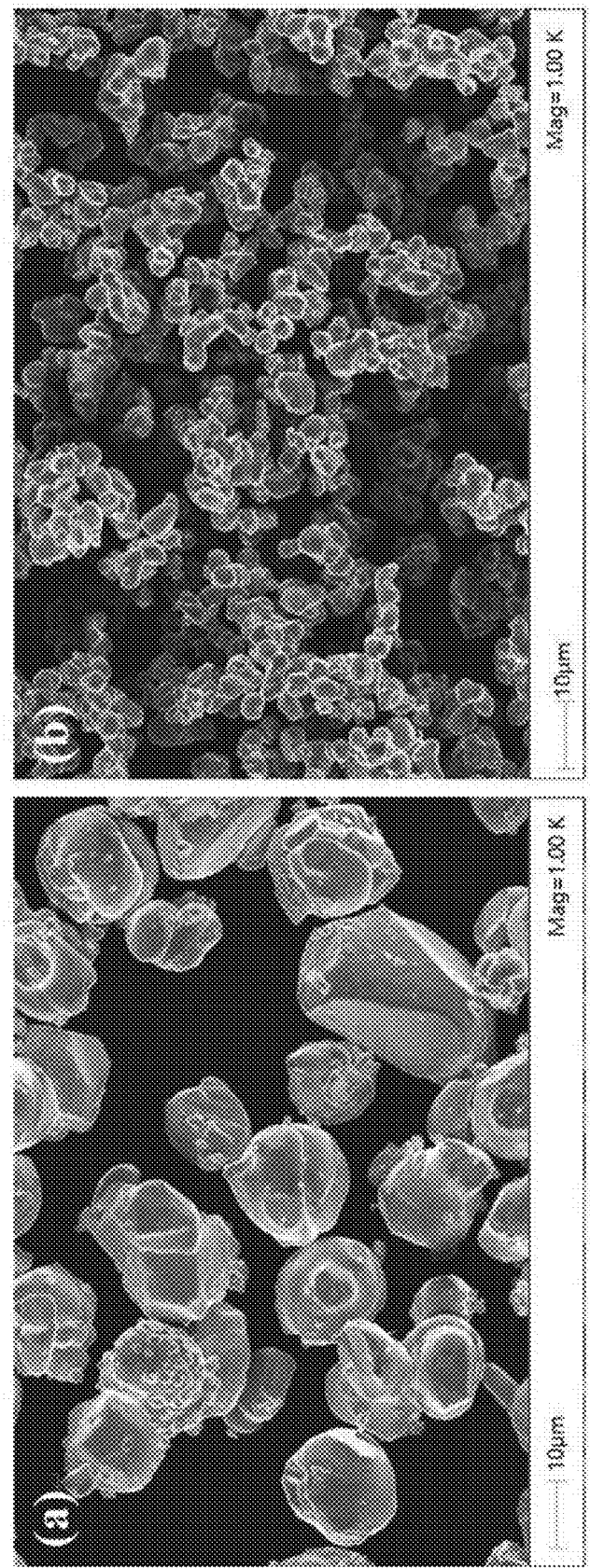
Figure 3:
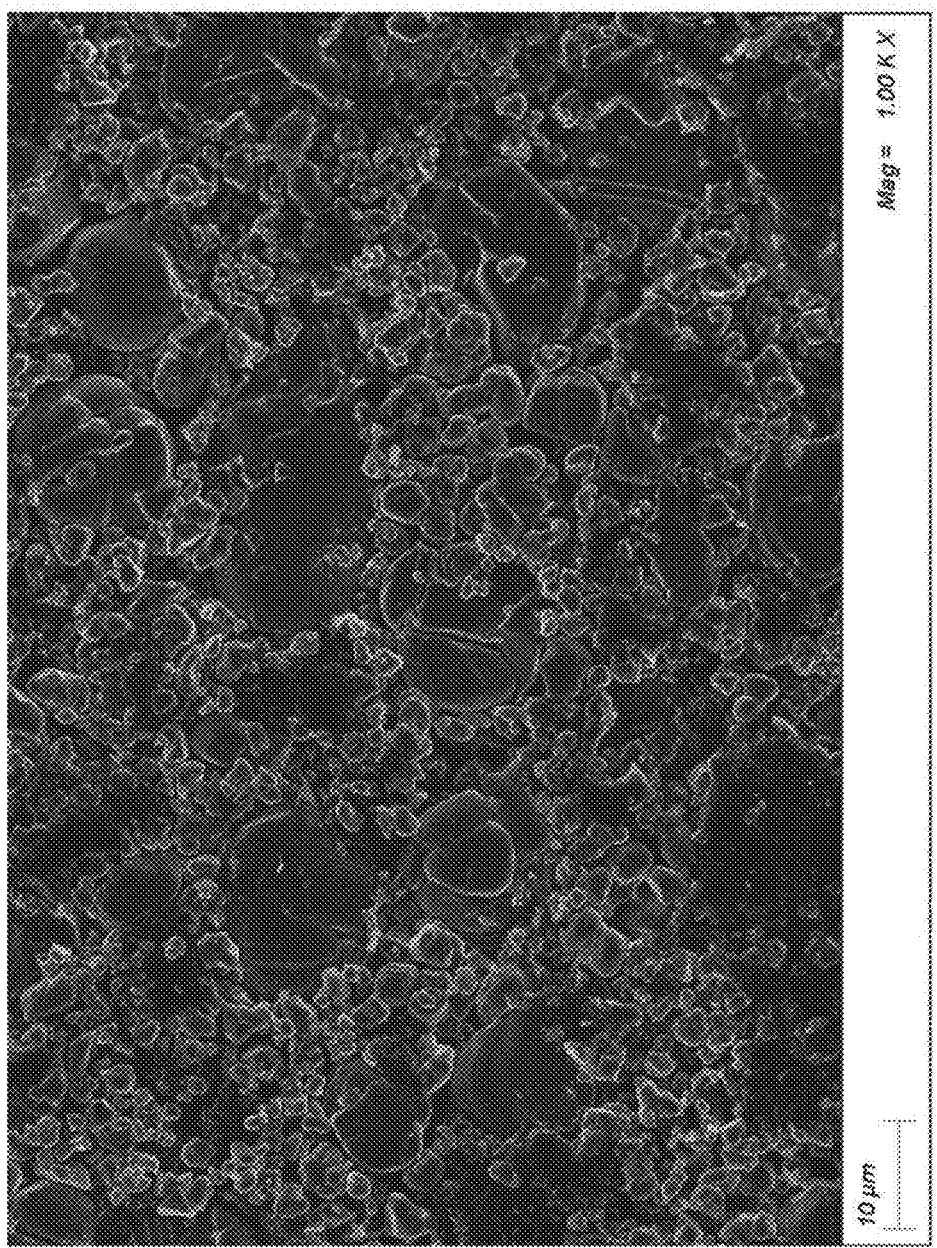
Figure 4:
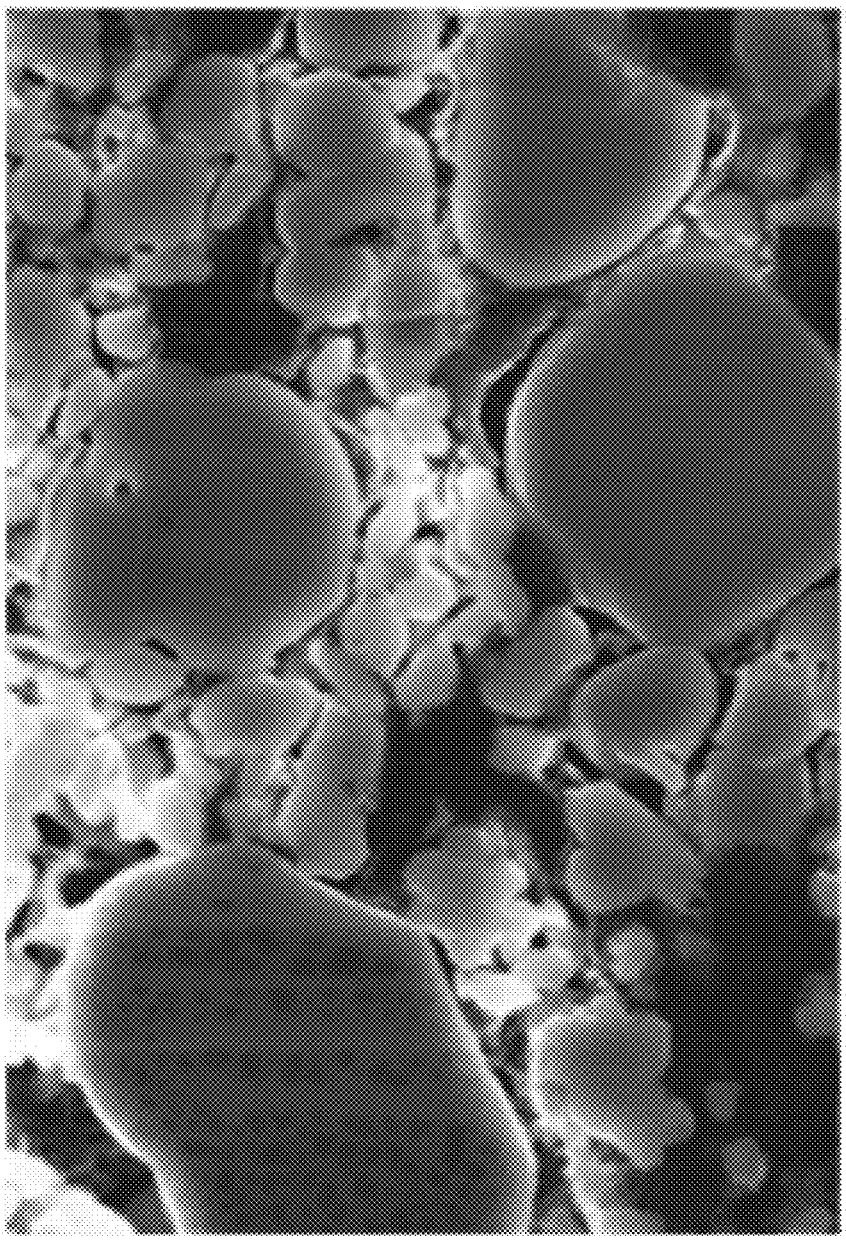
Figure 5:
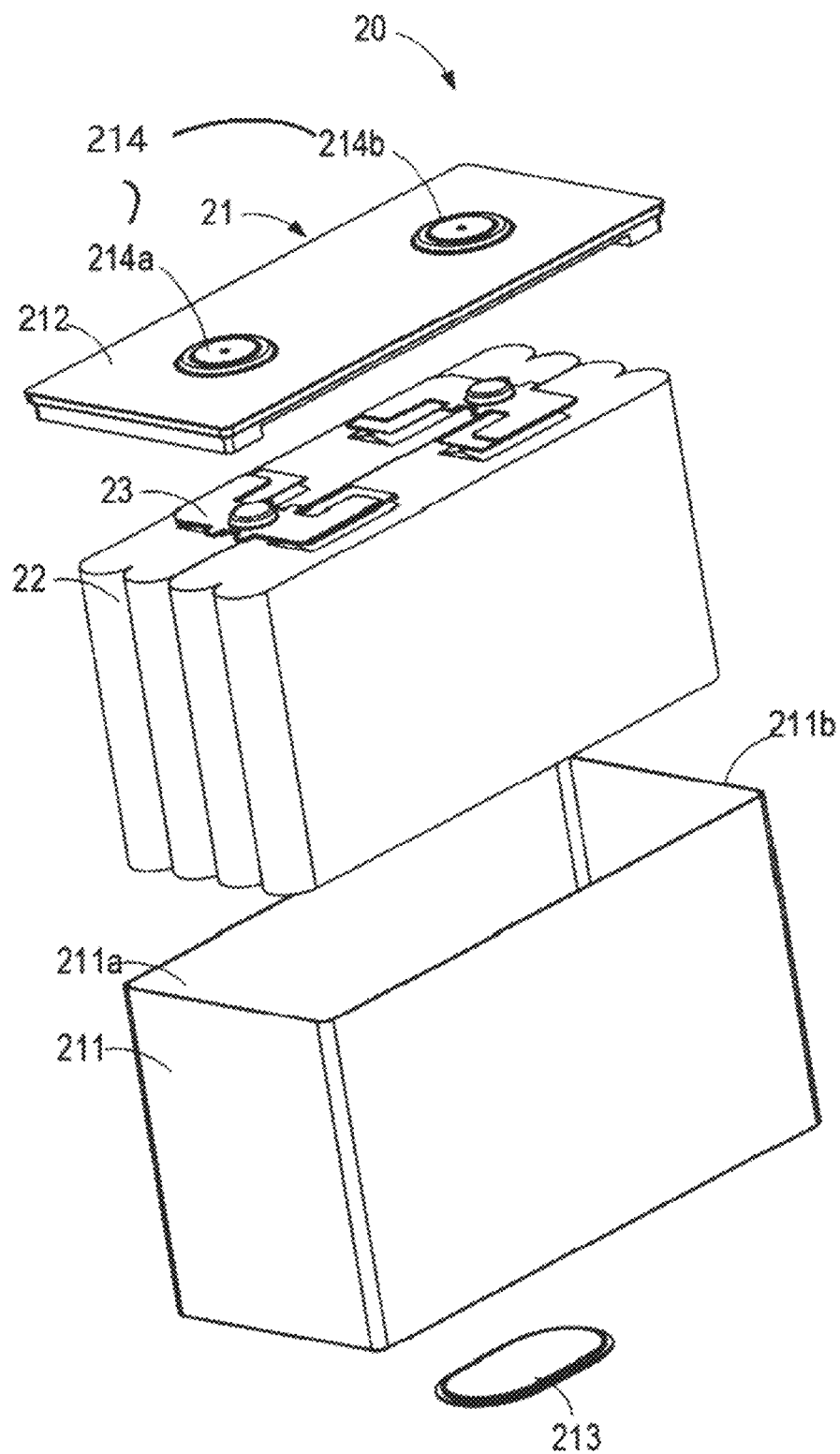
Figure 6:
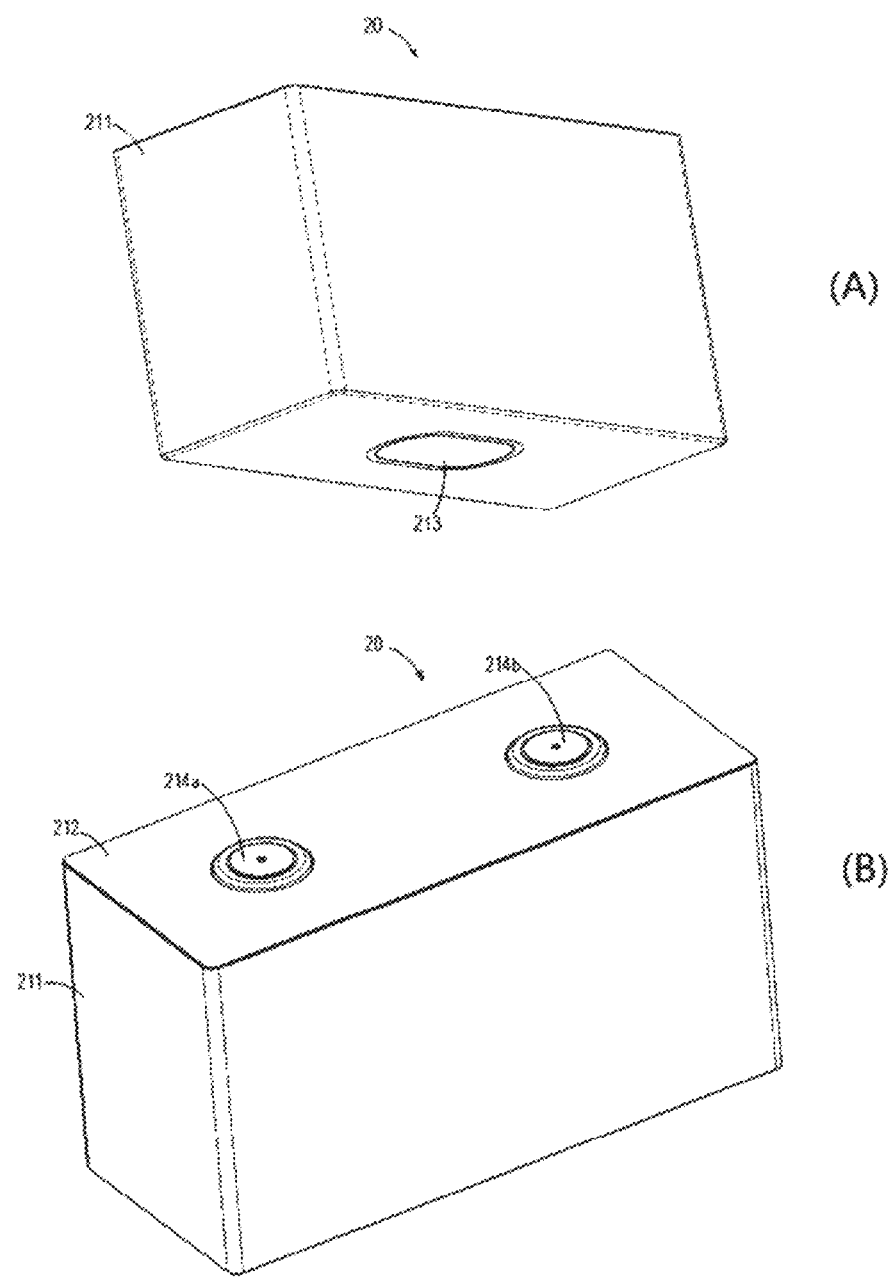
Figure 7:
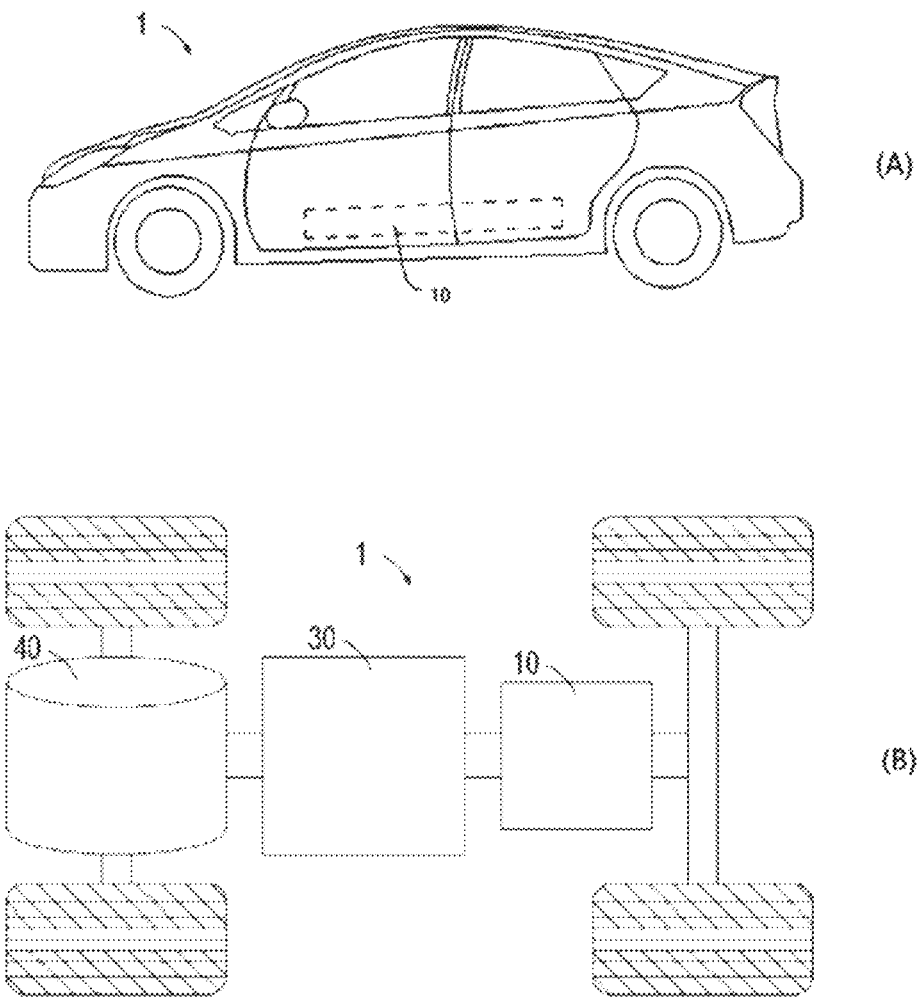

(a) and (b) in FIG. 2 respectively show scanning electron microscope images of LCO③ ($L_3$) lithium cobalt oxide and LCO③ ($M_2$) lithium cobalt oxide in Table 1;

FIG. 3 shows a scanning electron microscope image of a surface of an electrode plate, and the electrode plate is prepared from an electrode active composition in Example 7 in Table 3;

FIG. 4 is a scanning electron microscope image of a section of an electrode plate, and the electrode plate is prepared from an electrode active composition in Example 8 in Table 3;

FIG. 5 is a schematic diagram of a battery according to an embodiment of this application;

(A) in FIG. 6 is a schematic diagram of a shell of a battery, and (B) in FIG. 6 is a schematic diagram of the shell and a cover plate of the battery; and (A) and (B) in FIG. 7 respectively show a side view and a bottom view of a vehicle according to an embodiment of this application.

DESCRIPTION OF EMBODIMENTS

Content disclosed in this application is described in detail with the following embodiments. These embodiments are intended only for illustrative purposes because various modifications and changes made without departing from the scope of the content disclosed in this application are apparent to those skilled in the art. Unless otherwise stated, all parts, percentages, and ratios reported in the following examples are based on weight, all reagents used in the embodiments are commercially available or synthesized in a conventional manner, and can be used directly without further treatment, and all instruments used in the embodiments are commercially available.

The following embodiment provides an electrode active composition, including: a first component and a second component. The first component is lithium cobalt oxide particles (hereinafter referred to as LCO). The second component is ternary material particles (for example, selected from lithium nickel manganese cobalt oxide NCM or lithium nickel cobalt aluminum oxide NCA).

Example 1: Preparation of Raw Materials

In the following example, commercially-available lithium cobalt oxide powder (referred to as LCO) and commercially-available ternary material powder (including lithium nickel manganese cobalt oxide NCM or lithium nickel cobalt aluminum oxide NCA) were provided. Table 1 shows parameters of the powder.

TABLE 1

| Number | Chemical formula | Micro-morphology | Particle shape | Residual lithium percentage | $D_v10$ | $D_v50$ | $D_v90$ |
|---|---|---|---|---|---|---|---|
| LCO①(L₁) | $LiCoO_2$ | Single crystal | Sphere-like shape | x | 10.5 | 19 | 29.8 |
| LCO①(L₂) | $LiCoO_2$ | Single crystal | Sphere-like shape | x | 13.1 | 21 | 33.7 |
| LCO①(M₁) | $LiCoO_2$ | Single crystal | Sphere-like shape | x | 3.1 | 6.2 | 10 |
| LCO②(L₃) | $LiCo_{0.994}Al_{0.006}O_2$ | Single crystal | Sphere-like shape | x | 10.6 | 19.2 | 30.1 |
| LCO②(M₂) | $LiCo_{0.994}Al_{0.006}O_2$ | Single crystal | Sphere-like shape | x | 3.2 | 6.3 | 10.2 |
| LCO②(M₃) | $LiCo_{0.994}Al_{0.006}O_2$ | Single crystal | Sphere-like shape | x | 3.8 | 7.5 | 11 |
| LCO③(L₃) | $LiCo_{0.99}Al_{0.006}Mg_{0.002}Ti_{0.002}O_2$ | Single crystal | Sphere-like shape | x | 10.6 | 19.7 | 30.1 |
| LCO③(L₄) | $LiCo_{0.99}Al_{0.006}Mg_{0.002}Ti_{0.002}O_2$ | Single crystal | Sphere-like shape | x | 10.1 | 17 | 28 |
| LCO③(L₂) | $LiCo_{0.99}Al_{0.006}Mg_{0.002}Ti_{0.002}O_2$ | Single crystal | Sphere-like shape | x | 13.1 | 21 | 33.2 |
| LCO③(M₂) | $LiCo_{0.99}Al_{0.006}Mg_{0.002}Ti_{0.002}O_2$ | Single crystal | Sphere-like shape | x | 3.2 | 6.3 | 10.2 |
| LCO③(M₄) | $LiCo_{0.99}Al_{0.006}Mg_{0.002}Ti_{0.002}O_2$ | Single crystal | Sphere-like shape | x | 2.5 | 5 | 9.3 |
| NCM① | $LiNi_{0.82}Co_{0.12}Mn_{0.06}O_2$ | Single crystal | Irregular | 0.23% | 1.7 | 3.8 | 7.2 |
| NCM② | $LiNi_{0.82}Co_{0.118}Mn_{0.058}Zr_{0.004}O_2$ | Single crystal | Irregular | 0.21% | 1.8 | 3.9 | 7.5 |
| NCM③ | $LiNi_{0.82}Co_{0.118}Mn_{0.058}Al_{0.004}O_2$ | Single crystal | Irregular | 0.21% | 1.8 | 3.9 | 7.5 |
| NCA① | $LiNi_{0.8}Co_{0.15}Al_{0.05}O_2$ | Single crystal | Irregular | 0.27% | 1.8 | 3.9 | 7.5 |
| NCA② | $LiNi_{0.83}Co_{0.12}Al_{0.04}Ti_{0.005}Zr_{0.005}O_2$ | Single crystal | Irregular | 0.22% | 1.8 | 3.9 | 7.5 |

* "(L)" represents large-particle-size LCO powder, and "(M)" represents small-particle-size LCO powder.
* "①, ②, and ③" represent different chemical formulas.

Figure 1:
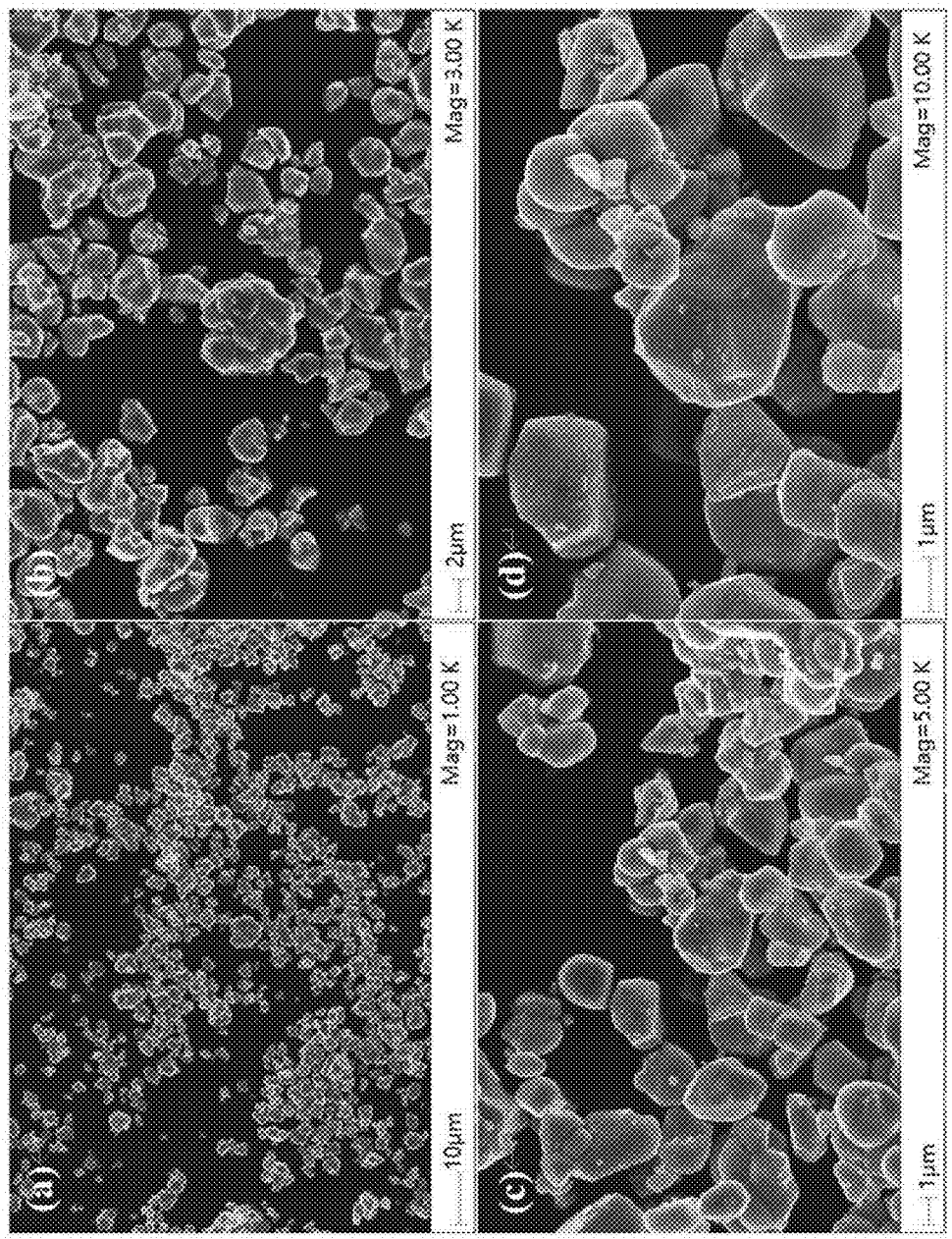
FIG. 1 shows scanning electron microscope images of NCM② lithium nickel manganese cobalt oxide in Table 1, and (a) to (d) show images of different magnification times or at different locations.

FIG. 1 shows scanning electron microscope images of NCM② lithium nickel manganese cobalt oxide in Table 1, and (a) to (d) show images of different magnification times or at different locations.

(a) and (b) in FIG. 2 respectively show scanning electron microscope images of LCO③ (L₃) lithium cobalt oxide and LCO③ (M₂) lithium cobalt oxide in Table 1.

Example 2: Preparation of a Raw Material (Ternary Material Particles with a Coating Layer)

In the following example, coating treatment was performed on ternary material particles to obtain the ternary material particles with the coating layer. The specific coating method was as follows.

Step 1: Ternary material powder (NCM①, NCM②, and NCM③, or NCA① and NCA② in Table 1) was provided as a core material.

Step 2: A solution containing a coating layer formation material was provided, where a formula of the solution containing the coating layer formation material is shown in Table 2.

Step 3: The product in step 1 and the product in step 2 were mixed at a weight ratio of 1:1, and stirred for 30 min after the mixing, followed by solid-liquid separation, and solid was collected.

Step 4: Heat treatment was performed on the solid obtained in the last step in an inert atmosphere in a closed environment to obtain an electrode active material with a coating layer, where heat treatment conditions are shown in Table 2.

Table 2 shows specific preparation parameters of active materials that have a coating layer and that are used in the foregoing examples.

TABLE 2

| Correspondences to ternary materials in Examples in Table 3 | Number | Core material Chemical | Raw material | | | | | | | Heat treatment Parameter | |
|---|---|---|---|---|---|---|---|---|---|---|---|
| | | | | Solution containing coating layer formation material | | | | | | | |
| | | | Solvent | Sulfur compound | Concentration (mol/L) | Lithium-containing compound | Concentration (mol/L) | Another compound | Concentration (mol/L) | Temperature (° C.) | Time (h) |
| Example 6 | NCM① containing an S coating layer | NCM① | 95% ethanol | Sulfamide | 0.5 | $LiNO_3$ | 0.5 | / | / | 175 | 8 |

TABLE 2-continued

| Correspondences to ternary materials in Examples in Table 3 | Number | Core material Chemical | Raw material | | | | | | Heat treatment Parameter | |
|---|---|---|---|---|---|---|---|---|---|---|
| | | | Solution containing coating layer formation material | | | | | | | |
| | | | Solvent | Sulfur compound | Concentration (mol/L) | Lithium-contaning compound | Concentration (mol/L) | Another compound | Concentration (mol/L) | Temperature (° C.) | Time (h) |
| Example 7 | NCM① containing an S coating layer | NCM① | 95% ethanol | Amino methanesulfonic acid | 0.4 | LiNO$_3$ | 0.5 | / | / | 265 | 8 |
| Example 8 | NCM② containing an S coating layer | NCM② | 95% ethanol | Sulfamide | 0.5 | / | / | / | / | 300 | 3 |
| Example 10 | NCM② containing an S coating layer | NCM② | 95% ethanol | Sulfamide | 0.5 | / | / | / | / | 245 | 8 |
| Example 11 | NCM② containing an S + B coating layer | NCM② | 95% ethanol | Sulfamide | 0.5 | / | / | H$_3$BO$_3$ | 0.2 | 150 | 20 |
| Example 12 | NCM② containing an S + P coating layer | NCM② | 95% ethanol | Sulfamide | 0.5 | / | / | Li$_3$PO$_4$ | 0.2 | 225 | 8 |
| Example 13 | NCM② containing an S + F coating layer | NCM② | Deionized water | Bistrifluoro-methane-sulfonimide lithium salt | 5 | / | / | / | / | 265 | 8 |
| Example 14 | NCM② containing an S + B + P + F coating layer | NCM② | 95% ethanol | Sulfamide | 0.5 | / | / | LiPF$_6$/ H$_3$BO$_3$ | 0.2/ 0.2 | 300 | 8 |
| Example 15 | NCA① containing an S coating layer | NCA① | 95% ethanol | Sulfamide | 0.5 | / | / | / | / | 245 | 8 |
| Example 16 | NCA② containing an S + P coating layer | NCA② | 95% ethanol | Sulfamide | 0.5 | / | / | Li$_3$PO$_4$ | 0.2 | 225 | 8 |
| Example 17 | NCM③ containing an S + B coating layer | NCM③ | 95% ethanol | Sulfamide | 0.5 | / | / | H$_3$BO$_3$ | 0.2 | 245 | 8 |

* Table 1 shows definitions of NCM①, NCM②, NCM③, NCA①, and NCA②.

Example 3: Preparation of a Composition (an Electrode Active Composition)

The following raw materials were selected from the raw materials prepared in Example 1 and the raw materials prepared in Example 2: the large-particle-size lithium cobalt oxide powder (LCO(L)), the small-particle-size lithium cobalt oxide powder (LCO(M)), and the ternary material powder (coated or uncoated). The raw materials were mixed to obtain the electrode active composition in Examples. Table 3 shows specific mixing ratios.

TABLE 3

| | LCO(L) | | | | LCO(M) | | | | Ternary material | | |
|---|---|---|---|---|---|---|---|---|---|---|---|
| | Chemical formula | $D_v10$ | $D_v50$ | $D_v90$ | Per-centage | Chemical formula | $D_v10$ | $D_v50$ | $D_v90$ | Per-centage | Chemical formula | $D_v50$ | Per-centage |
| Example 1 | LCO①(L₂) | 13.1 | 21 | 33.2 | 70.7 | LCO①(M₁) | 3.1 | 6.2 | 10 | 19.3 | NCM① | 3.8 | 10 |
| Example 2 | LCO①(L₄) | 10.1 | 17 | 28 | 86.1 | LCO①(M₃) | 3.8 | 7.5 | 11 | 3.9 | NCM① | 3.8 | 10 |
| Example 3 | LCO①(L₂) | 13.1 | 21 | 33.2 | 39.3 | LCO①(M₁) | 3.1 | 6.2 | 10 | 10.7 | NCM① | 3.8 | 50 |
| Example 4 | LCO①(L₄) | 10.1 | 17 | 28 | 47.9 | LCO①(M₁) | 3.1 | 6.2 | 10 | 2.1 | NCM① | 3.8 | 50 |
| Example 5 | LCO①(L₁) | 10.5 | 19 | 29.8 | 63 | LCO①(M₁) | 3.1 | 6.2 | 10 | 7 | NCM① | 3.8 | 30 |
| Example 6 | LCO①(L₁) | 10.5 | 19 | 29.8 | 63 | LCO①(M₁) | 3.1 | 6.2 | 10 | 7 | NCM① containing an S coating layer | 3.9 | 30 |
| Example 7 | LCO②(L₃) | 10.6 | 19.2 | 30.1 | 63 | LCO②(M₂) | 3.2 | 6.3 | 10.2 | 7 | NCM① containing an S coating layer | 3.9 | 30 |
| Example 8 | LCO②(L₂) | 13.1 | 21 | 33.2 | 55 | LCO②(M₂) | 3.2 | 6.3 | 10.2 | 15 | NCM② containing an S coating layer | 4 | 30 |
| Example 9 | LCO②(L₃) | 10.6 | 19.2 | 30.1 | 54 | LCO②(M₃) | 3.8 | 7.5 | 11 | 6 | NCM② | 3.9 | 40 |
| Example 10 | LCO②(L₃) | 10.6 | 19.2 | 30.1 | 54 | LCO②(M₃) | 3.8 | 7.5 | 11 | 6 | NCM② containing an S coating layer | 4 | 40 |
| Example 11 | LCO③(L₃) | 10.6 | 19.2 | 30.1 | 63 | LCO③(M₂) | 3.2 | 6.3 | 10.2 | 7 | NCM② containing an S + B coating layer | 4 | 30 |
| Example 12 | LCO③(L₄) | 10.1 | 17 | 28 | 63 | LCO③(M₄) | 2.5 | 5 | 9.3 | 7 | NCM② containing an S + P coating layer | 4 | 30 |
| Example 13 | LCO③(L₂) | 13.1 | 21 | 33.2 | 72 | LCO③(M₂) | 3.2 | 6.3 | 10.2 | 8 | NCM② containing an S + F coating layer | 4 | 20 |
| Example 14 | LCO③(L₃) | 10.6 | 19.2 | 30.1 | 76.6 | LCO③(M₂) | 3.2 | 6.3 | 10.2 | 3.4 | NCM② containing an S + B + F coating layer | 4 | 20 |
| Example 15 | LCO③(L₃) | 10.6 | 19.2 | 30.1 | 63 | LCO③(M₂) | 3.2 | 6.3 | 10.2 | 7 | NCA① containing an S coating layer | 4 | 30 |
| Example 16 | LCO③(L₃) | 10.6 | 19.2 | 30.1 | 63 | LCO③(M₂) | 3.2 | 6.3 | 10.2 | 7 | NCA② containing an S + P coating layer | 4 | 30 |
| Example 17 | LCO③(L₃) | 10.6 | 19.2 | 30.1 | 63 | LCO③(M₂) | 3.2 | 6.3 | 10.2 | 7 | NCM③ containing an S + B coating layer | 4 | 30 |
| Comparative Example 1 | Same as Example 2 | 13.1 | 21 | 33.2 | 45 | Same as Example 1 | 3.1 | 6.2 | 10 | 25 | Same as Example 1 | 3.8 | 30 |
| Comparative Example 2 | Same as Example 2 | 10.1 | 17 | 28 | 68 | Same as Example 2 | 3.8 | 7.5 | 11 | 2 | Same as Example 2 | 3.8 | 30 |
| Comparative Example 3 | Same as Example 6 | 10.5 | 19 | 29.8 | 40 | Same as Example 6 | 3.1 | 6.2 | 10 | 30 | Same as Example 6 | 3.9 | 30 |
| Comparative example 4 | Same as Example 6 | 10.5 | 19 | 29.8 | 69 | Same as Example 6 | 3.1 | 6.2 | 10 | 1 | Same as Example 6 | 3.9 | 30 |

* Definitions of materials with a coating layer are the same as that in Table 2.

Analysis and Test

The following describes tests of electrochemical performance, physical performance, and chemical performance of the materials in the foregoing Examples and Comparative Examples.

1. Assembly of a Battery

The electronic active material was assembled in a battery to test the electrochemical performance of the materials. Specifically, the prepared electrode active composition was used as a positive electrode active material for a lithium-ion secondary battery and is assembled into a button battery. A specific method of assembling the battery was as follows.

Positive electrode plate: The foregoing electrode active substance was mixed with carbon black and a binder (PVDF) at a mass ratio of 88:6:6, the resulting mixture was added with a solvent N-methylpyrrolidone (NMP) and stirred to form even positive electrode slurry, and the positive electrode slurry was applied to a surface of positive electrode current collector aluminum foil, followed by drying and cold pressing, to obtain a positive electrode plate. An active substance capacity of the positive electrode plate was 5 mg/cm²-14 mg/cm².

Negative electrode plate: Lithium metal was used as a negative electrode plate.

Separator: A polyethylene (PE) thin film was used.

Electrolyte: Ethylene carbonate (EC), ethyl methyl carbonate (EMC), and diethyl carbonate (DEC) were mixed at a volume ratio of 1:1:1, and then $LiPF_6$ was evenly dissolved in the foregoing solution to obtain an electrolyte, where a concentration of $LiPF_6$ was 1 mol/L.

Assembling of the button battery: The positive electrode plate, the separator, and the negative electrode plate were sequentially stacked, and then the electrolyte was injected, to obtain the button battery of CR2430 model.

2. Test of Electrochemical Performance of the Battery

Test of electrochemical performance of the prepared button battery included:

(2.1) Test of Capacity Per Gram/Volumetric Specific Energy:

The battery was charged and discharged at a constant test room temperature (25° C.) by using a LAND CT2001A electrochemical tester.

A charging and discharging method was as follows:

1. The battery was left standing for 10 min at a constant temperature of 25° C.

2. The battery was charged with a constant current at a current of a preset rate (0.1 C, 0.5 C, or 5 C used in the following Examples) to a cut-off voltage (in the following Examples, the cut-off voltage was set to 4.45 V and may be correspondingly adjusted based on different to-be-tested batteries), and was then charged with a constant voltage (4.45 V) until a charging current was ≤0.05 C.

3. The battery was left standing for 5 min.

4. The battery was discharged with a constant current at a current of the foregoing preset rate to an end-off voltage (in the following examples, the end-off voltage was set to 2.8 V and may be correspondingly adjusted based on different to-be-tested batteries).

5. A specific discharge capacity, a specific discharge energy, and a discharge volumetric specific energy in the first cycle were used as a specific capacity, a mass specific energy, and a volumetric specific energy of a reference technical material.

The charge/discharge current was a preset rate multiplied by a rated capacity of the battery. The rated capacity was a positive electrode theoretical capacity of the button battery under a preset voltage.

The specific capacity at the preset rate was a capacity value of a unit mass of active material at the preset rate, measured in mAh/g or Ah/kg.

The mass specific energy at the preset rate was an energy value of a unit mass of active material at the preset rate, measured in wh/kg.

The volumetric specific energy at the preset rate was an energy value of a unit volume of active material at the preset rate, measured in wh/L. Volume of the active material=Mass of the active material/Compacted density. Volumetric specific energy at the preset rate=Mass specific energy at the preset rate×Compacted density of the active material.

(2.2) Test of Cycling Performance:

A test temperature was kept at 25° C. A charging and discharging test method was as follows:

1. The battery was left standing for 2 h.

2. The battery was charged with a constant current at a preset current (0.5 C in the following Examples) to a cut-off voltage (in the following Examples, the cut-off voltage was set to 4.45 V and may be correspondingly adjusted based on different to-be-tested batteries), and was then charged constantly with the foregoing cut-off voltage (4.45 V) until a charging current was ≤0.05 C.

3. The battery was left standing for 5 min.

4. The battery was discharged with a constant current at a current of 0.5 C to an end-off voltage (in the following examples, the end-off voltage was set to 2.8 V and may be correspondingly adjusted based on different to-be-tested batteries).

5. The battery was left standing for 5 min.

6. Steps 2 to 5 were performed repeatedly for 100 cycles of charge and discharge.

$$\text{Capacity retention rate for 100 cycles at } 0.5C = \frac{\text{Discharge capacity in } 100th \text{ cycle}}{\text{Discharge capacity in } 1st \text{ cycle}} \times 100\%$$

(2.3) Test of 5 C-Rate Performance:

A temperature was kept at 25° C.

A charging and discharging method was as follows:

1. The battery was left standing for 2 h.

2. The battery was charged with a constant current at a current of 0.1 C to a cut-off voltage (in the following Examples, the cut-off voltage was set to 4.45 V and may be correspondingly adjusted based on different to-be-tested batteries), and was then charged constantly with the foregoing cut-off voltage until a charging current was ≤0.05 C.

3. The battery was left standing for 5 min.

4. The battery was discharged with a constant current at a current of 0.1 C to an end-off voltage (in the following examples, the end-off voltage was set to 2.8 V and may be correspondingly adjusted based on different to-be-tested batteries), to obtain a discharge capacity at a rate of 0.1 C.

5. The battery was left standing for 5 min.

6. The battery was charged with a constant current at a current of 0.1 C to a cut-off voltage (in the following Examples, the cut-off voltage was set to 4.45 V and may be correspondingly adjusted based on different to-be-tested batteries), and was then charged constantly with the foregoing cut-off voltage until a charging current was ≤0.05 C.

7. The battery was left standing for 5 min.

8. The battery was discharged with a constant current at a current of 5C to an end-off voltage (in the following examples, the end-off voltage was set to 2.8 V and may be correspondingly adjusted based on different to-be-tested batteries), to obtain a discharge capacity at a rate of 5 C.

9. 5 C/0.1 C Discharge capacity ratio was calculated according to the following formula.

$$5C/0.1C \text{ Discharge capacity ratio} = \frac{\text{Discharge capacity at a rate of } 5C}{\text{Discharge capacity at a rate of } 0.1C} \times 100\%$$

3. Test of Physical/Chemical Performance of the Electrode Active Composition (3.1) Test of a Compacted Density:

Test was performed according to the standard GB/T24533-2009 by using a compression-testing machine, for example, a compression-testing machine of UTM7305 model. Approximately 1 g of a sample was accurately weighted and added into a mold with a base area of 1.327 cm². A pressure device was used to apply 5 tons of pressure on the sample for 30 seconds and then release the pressure. After that, a height of the sample was measured, to obtain a compacted density of the material according to the following formula: ρ=m/(1.327*h), where ρ was the compacted density of the material, m was a mass of the sample, and h was the height of the sample that was pressed by 5 tons of pressure for 30 seconds and then released from the pressure.

(3.2) Test of Particle Size:

Particle sizes $D_v10$, $D_v50$, and $D_v90$ were analyzed by using a laser particle size analyzer of Mastersizer 3000E model from the England Malvern Instruments Limited. For a test method, refer to a GB/T 19077-2016 particle size laser diffraction method. A dispersion medium was water. An index of refraction of the sample was 1.62.

(3.3) Test Method of Percentages of Elements Such as S, B, P, F, Al, Zr, Ti, and Mg:

The percentages of the elements such as S, B, P, F, Al, Zr, Ti, and Mg in the electrode active composition may be measured by using an instrument and a method commonly known in the field.

For example, the percentages of the element S, the element B, the element P, the element Al, the element Zr, the element Ti, and the element Mg were measured according to the EPA 6010D-2014 Inductively Coupled Plasma Atomic Emission Spectrometry. The test instrument may use the ICAP-7000 inductively coupled plasma optical emission spectrometer (ICP-OES) from Thermo Fisher Scientific (Thermo Fisher Scientific). The test method included the following steps: performing digestion on 0.4 g of to-be-tested sample by using 10 mL of aqua regia, after the digestion was completed, transferring an entire digestion solution into a 100-mL volumetric flask to reach a specific volume, and measuring the percentages of all the elements by using the ICAP-7000 ICP-OES.

For example, the percentage of the element F was measured according to the *General Rules for Ion Chromatography JYT202-1996*. The test instrument may use an ICS-900 ion chromatograph. The test method included the following steps: performing digestion on 0.4 g of to-be-tested sample by using 10 mL of aqua regia, diluting the obtained solution to 250 mL to reach a specific volume, and measuring the percentage of the element F.

(3.4) Test of an $R_{11}:R_6$ Value

The $R_{11}:R_6$ value was measured by the following method:

Slurry was prepared from an electrode active composition, and the slurry was applied to a current collector, followed by drying, to prepare an electrode plate.

The positive electrode plate was cut by using a plasma cutting (Plasma Cutting) technology to obtain a neat section, and the section was observed under a scanning electron microscope equipped with an energy dispersive spectrometer (EDS). Analysis was performed on 20 random sampling regions, where each sampling region satisfied length×width≥36.4 μm×25.1 μm.

For each sampling region, a composition of each particle in each region was analyzed by using an energy dispersive spectrometer technology. Whether the particle was a lithium cobalt oxide particle or not was determined based on the composition of the particle. In the foregoing example, an identification standard of the lithium cobalt oxide included. If the percentage of the element Co in the particle was ≥30 wt % and the percentage of the element Ni was <5 wt %, the particle was determined as the lithium cobalt oxide particle.

After all the lithium cobalt oxide particles in the sampling regions were found, the particle size of each lithium cobalt oxide particle was measured. The measurement method included: For those particles entirely entering a field of view of the sampling region, a diameter of a circumcircle of a profile of the particle was used as a particle size of the particle, the particle with a particle size ≥11 μm was counted as 1 large particle, and the particle with a particle size ≤6 μm was counted as 1 small particle. For those particles that were located on an edge of the sampling region and that only partially entered the field of view of the sampling region, the particle with a particle size ≥11 μm was counted as 1 large particle, and the particle with a particle size ≤6 μm was counted as 0.5 small particle. Finally, a total number of the large particles (particle size ≥11 μm) and a total number of the small particles (particle size ≤6 μm) were respectively counted, to obtain a ratio $R_{11}:R_6$ of the two numbers.

The ratios $R_{11}:R_6$ of the 20 sampling regions were averaged to obtain a final test result.

In Examples and Comparative Examples of this application, a sum of the number of the lithium cobalt oxide particles with a particle size ≥11 μm and the number of the lithium cobalt oxide particles with a particle size ≤6 μm accounts for above 90% of a summed number of lithium cobalt oxide particles.

FIG. 3 shows a scanning electron microscope image of a surface of an electrode plate, and the electrode plate is prepared from an electrode active composition in Example 7 in Table 3.

FIG. 4 shows a scanning electron microscope image of a section of an electrode plate, and the electrode plate is prepared from an electrode active composition in Example 8 in Table 3.

Table 4 shows test results of all the foregoing indexes.

TABLE 4

Detailed description of detection results

| | | | | | 0.1 C | | 0.5 C 100 cycles | | 5 C 5 C/0.1 C |
|---|---|---|---|---|---|---|---|---|---|
| | | $R_{11}:R_6$ | Compacted density (g/cm³) | Gravimetric specific energy (wh/kg) | Volumetric specific energy (Wh/L) | Gram capacity mAh/g | Capacity retention rate (%) | Gram capacity mAh/g | Discharge capacity ratio (%) |
| Example 1 | | 0.2 | 4.15 | 716.4 | 2973.1 | 179.1 | 86.2 | 141.1 | 78.8 |
| Example 2 | | 4.8 | 4.12 | 716 | 2949.9 | 179 | 83.3 | 132.9 | 74.2 |
| Example 3 | | 0.2 | 4.05 | 766.3 | 3103.5 | 194.5 | 84.5 | 149.9 | 77.1 |
| Example 4 | | 2.8 | 4.08 | 765.9 | 3124.9 | 194.4 | 84.4 | 149.7 | 77.0 |
| Example 5 | | 0.7 | 4.23 | 744.4 | 3148.8 | 187.5 | 87.3 | 149.3 | 79.6 |
| Example 6 | | 0.7 | 4.23 | 749.1 | 3168.7 | 188.7 | 91.2 | 153.6 | 81.4 |
| Example 7 | | 0.7 | 4.23 | 750.7 | 3175.5 | 189.1 | 91.5 | 155.2 | 82.1 |
| Example 8 | | 0.2 | 4.16 | 749.5 | 3117.9 | 188.8 | 91.5 | 153.5 | 81.3 |
| Example 9 | | 1.3 | 4.12 | 754.5 | 3108.5 | 191 | 89.5 | 154.3 | 80.8 |
| Example 10 | | 1.3 | 4.12 | 755.2 | 3111.4 | 191.2 | 92.5 | 156 | 81.6 |
| Example 11 | | 0.7 | 4.23 | 753.5 | 3187.3 | 189.8 | 94.3 | 157.5 | 83.0 |
| Example 12 | | 0.6 | 4.2 | 751.1 | 3154.6 | 189.2 | 94.1 | 156.5 | 82.7 |
| Example 13 | | 0.5 | 4.22 | 739.7 | 3121.5 | 185.4 | 93.7 | 152.1 | 82.0 |
| Example 14 | | 1.8 | 4.17 | 738.2 | 3078.3 | 185 | 92.4 | 150.4 | 81.3 |

TABLE 4-continued

Detailed description of detection results

| | | | 0.1 C | | | 0.5 C 100 cycles | 5 C | 5 C/0.1 C |
|---|---|---|---|---|---|---|---|---|
| | $R_{11}:R_6$ | Compacted density (g/cm³) | Gravimetric specific energy (wh/kg) | Volumetric specific energy (Wh/L) | Gram capacity mAh/g | Capacity retention rate (%) | Gram capacity mAh/g | Discharge capacity ratio (%) |
| Example 15 | 0.7 | 4.22 | 751.1 | 3169.6 | 189.2 | 93.2 | 154.8 | 81.8 |
| Example 16 | 0.7 | 4.22 | 753.1 | 3178.1 | 189.7 | 94 | 156.8 | 82.7 |
| Example 17 | 0.7 | 4.23 | 752.3 | 3182.2 | 189.5 | 94.2 | 157.2 | 83.0 |
| Comparative Example 1 | 0.1 | 3.8 | 733.3 | 2786.5 | 184.7 | 72.2 | 123.5 | 66.9 |
| Comparative Example 2 | 7.3 | 3.85 | 729.3 | 2807.8 | 183.7 | 73.5 | 105.5 | 57.4 |
| Comparative Example 3 | 0.1 | 3.75 | 731.7 | 2743.9 | 184.3 | 73.7 | 121.5 | 65.2 |
| Comparative Example 4 | 5.6 | 3.85 | 734.8 | 2829.0 | 185.1 | 75.8 | 110.5 | 59.7 |

By comparing test effects of the foregoing Examples and Comparative Examples, the following conclusions can be obtained:

(1) When the ratio in number of the lithium cobalt oxide particles with a particle size greater than 11 μm to the lithium cobalt oxide particles with a particle size less than 6 μm in the battery active composition is 0.2-1.8, obtained battery performance (for example, at least one of the gram capacity, the volume capacity, the cycle retention rate, and the rate performance) has been improved.

(2) When the ratio in number of the lithium cobalt oxide particles with a particle size greater than 11 μm to the lithium cobalt oxide particles with a particle size less than 6 μm in the battery active composition is 0.2-1.2, the obtained battery performance (for example, at least one of the gram capacity, the volumetric specific energy, the cycle retention rate, and the rate performance) has been improved.

(3) When the weight percentage of the ternary material particle in the battery active composition is 20 wt %-40 wt %, the obtained battery performance has been improved.

(4) When the coating layer of a specific composition is applied to the surface of the ternary material particle, the obtained battery performance (for example, at least one of the gram capacity, the volume capacity, the cycle retention rate, and the rate performance) has been improved.

(5) When the coating layer on the surface of the ternary material particle contains specific doping elements, the obtained battery performance (for example, at least one of the gram capacity, the volume capacity, the cycle retention rate, and the rate performance) has been improved.

According to some embodiments of this application, this application provides a battery.

FIG. 5 shows a battery 10 according to an embodiment of this application. (A) in FIG. 6 shows a shell of a battery, and (B) in FIG. 6 shows a schematic diagram of the shell and a cover plate of the battery. As shown in FIG. 5 and FIG. 6, in this embodiment, the battery may also be referred to as a battery cell 20. The battery cell 20 includes a housing 21, an electrode assembly 22, and an electrolyte, where the electrode assembly 22 is accommodated in the housing 21 of the battery cell 20, and the electrode assembly 22 includes a positive electrode plate, a negative electrode plate, and a separator. The separator may be the separator prepared in the embodiments of this application. The electrode assembly 22 may be a wound structure or a stacked structure, and may, for example, be the structure actually used in the embodiments of this application. The housing 21 includes a shell 211 and a cover plate 212. The shell 211 includes an accommodating chamber 211a formed by a plurality of walls, and an opening 211b. The cover plate 212 is disposed on the opening 211b to seal the accommodating chamber 211a. In addition to the electrode assembly 22, the accommodating chamber 211a further accommodates the electrolyte. The positive electrode plate and the negative electrode plate of the electrode assembly 22 are generally provided with tabs. The tabs generally include a positive electrode tab and a negative electrode tab. According to some embodiments of this application, a plurality of positive electrode tabs are provided and stacked, and a plurality of negative electrode tabs are provided and stacked. The tabs are connected to a positive electrode terminal 214a and a negative electrode terminal 214b outside the battery cell 20 through connection members 23. In the description of this application, the positive electrode terminal 214a and the negative electrode terminal 214b are collectively referred to as an electrode terminal 214. For a prismatic cell, the electrode terminal 214 may generally be disposed on the cover plate 212.

According to some embodiments of this application, this application provides an apparatus. The apparatus may include a mobile phone, a portable device, a laptop, an electric scooter, an electric vehicle, a steamship, a spacecraft, an electric toy, an electric tool, or the like. The spacecraft may include an airplane, a rocket, a space shuttle, a spaceship, or the like. The electric toy includes a fixed or mobile electric toy, such as a game console, an electric vehicle toy, an electric ship toy, and an electric airplane toy. The electric tool includes an electric metal cutting tool, an electric grinding tool, an electric assembly tool, and an electric railway-specific tool, such as an electric drill, an electric grinder, an electric wrench, an electric screwdriver, an electric hammer, an electric impact drill, a concrete vibrator, and an electric planer.

In this embodiment, the apparatus includes a vehicle. For example, (A) and (B) in FIG. 7 respectively show a side view and a bottom view of a vehicle according to an embodiment of this application. The vehicle may be an oil-fueled vehicle, a gas-powered vehicle, or a new energy vehicle. The new energy vehicle may be a battery electric vehicle, a hybrid electric vehicle, an extended-range electric vehicle, or the like. As shown in (A) of FIG. 7, a battery 10 may be disposed in the vehicle 1. As shown in (A) of FIG. 7, the battery 10 is disposed at the bottom of the vehicle. However, the battery 10 may alternatively be disposed at the head or the tail of the vehicle 1 as required. When the vehicle is driven, the battery 10 may intermittently or continuously supply power to the vehicle 1. For example, the battery 10 may supply electrical energy to apparatuses in the vehicle 1, such as a lamp, a liquid crystal display, and an igniter. For a hybrid electric vehicle or an electric vehicle, the battery 10 may also supply driving power to the vehicle 1. As shown in (B) of FIG. 7, the vehicle 1 may further include a controller 30 and a motor 40, and the controller 30 is configured to control the battery 10 to supply power to the motor 40, for example, to satisfy a working electricity need during start, navigation, and driving of the vehicle 1. In another embodiment of this application, the battery 10 not only can be used as an operational power supply for the vehicle 1, but also can be used as a driving power supply for the vehicle 1, to totally or partially replace fossil fuel or natural gas to provide driving power for the vehicle 1. According to an embodiment of this application, the battery 10 used in the vehicle may alternatively be a battery pack that includes a plurality of battery cells 20 shown in FIG. 5 and FIG. 6.

The foregoing descriptions are merely specific embodiments, but are not intended to limit the protection scope. Any equivalent modifications or replacements readily figured out by a person skilled in the art within the technical scope disclosed in this application shall fall within the protection scope. Therefore, the scope of protection shall be subject to the scope of protection of the claims.

What is claimed is:

1. An electrode active composition, comprising:
a plurality of first particles of lithium cobalt oxide having a formula of $Li_xCo_yM^1_{(1-y)}O_2$, wherein x satisfies 0.95≤x≤1.05, y satisfies 0.8≤y≤1, and $M^1$ is selected from the group consisting of Zr, Mg, Ti, Sr, W, Nb, Al, P, F, S, and any combination thereof; and
a plurality of second particles, each one of the second particles having a core-coating layer structure, the core-coating layer structure comprising a core and a coating layer, wherein
the core of the second particles is a ternary material selected from the group consisting of lithium nickel cobalt aluminum oxide, lithium nickel manganese cobalt oxide, and a combination thereof; and
the coating layer is disposed on at least a partial surface of the core and comprises a reaction product of a sulfur-containing compound and a lithium-containing compound, the reaction product comprises Li, S, and O, S in the coating layer accounts for 400 ppm-5000 ppm in the second particles by weight, the reaction product further comprises an element selected from the group consisting of P, F, or a combination thereof, when the reaction product comprises P, P accounts for 500 ppm-3000 ppm in the second particles by weight, and when the reaction product comprises F, F accounts for 200 ppm-1500 ppm in the second particles by weight;
wherein the plurality of first particles comprise lithium cobalt oxide particles with a particle size greater than 11 μm and lithium cobalt oxide particles with a particle size less than 6 and a ratio in number of the lithium cobalt oxide particles with a particle size greater than 11 μm to the lithium cobalt oxide particles with a particle size less than 6 μm is 0.2-4.8; and a summed number of the lithium cobalt oxide particles with a particle size greater than 11 and the lithium cobalt oxide particles with a particle size less than 6 μm accounts for above 90% of a total number of particles in the first particles.

2. The electrode active composition according to claim 1, wherein a weight ratio of the first particles to the second particles is 1:1 to 9:1.

3. The electrode active composition according to claim 1, wherein a particle size of the second particles is 2 μm-6 μm.

4. The electrode active composition according to claim 1, wherein:
the second particles have at least a single crystal structure.

5. The electrode active composition according to claim 1, wherein
a chemical formula of the lithium nickel manganese cobalt oxide is $Li_aNi_bCo_cMn_dM^2_{(1-b-c-d)}O_2$, wherein 0.5≤a≤1.2, 0.65≤b≤1, 0<c≤0.35, 0<d≤0.35, and $M^2$ is selected from the group consisting of Zr, Zn, Ti, Sr, Sb, Y, W, Al, B, P, F, S, and any combination thereof; and
a chemical formula of the lithium nickel cobalt aluminum oxide is $Li_xNi_eCo_fAl_gM^3_{(1-e-f-g)}O_2$, 0.5≤x≤1.2, 0.5≤e≤1, 0<f≤0.5, 0<g≤0.5, and $M^3$ is selected from the group consisting of Zr, Mg, Ba, Ti, Sr, Sb, Y, W, B, or any combination thereof.

6. The electrode active composition according to claim 1, wherein a compacted density of the electrode active composition is ≥4.05 g/cm³, and the compacted density is a density of a briquette formed by pressing the electrode active composition for 30 seconds under a pressure of 5 tons.

7. The electrode active composition according to claim 1, wherein the coating layer further contains B and B accounts for 500 ppm-3000 ppm in the second particles by weight.

8. The electrode active composition according to claim 1, wherein
the lithium-containing compound is selected from the group consisting of: $Li_2O$, LiOH, $Li_2CO_3$, $LiNO_3$, $LiPF_6$, lithium oxalate, lithium acetate, and any combinations thereof.

9. The electrode active composition according to claim 1, wherein the sulfur-containing compound is selected from the group consisting of: mercaptan, thiophenol, thioether, thioaldehyde, thioketone, thionocarboxylic acid, sulphoxide, sulfone, sulfur oxoacid, R1-S(=O)$_2$—R2, R1-C(=S)—R2,

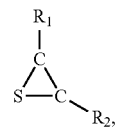

R1-C—S—C—R2, R1-S(=O)$_2$—LiN—S(=O)$_2$—R2, sulfamide, sulfamic acid, lithium bisfluorosulfonimide, thiopropionamide, thioisobutyramide, propylene sulfide, methyl ethyl sulfide, or and any combination thereof, wherein R1 and R2 are each independently selected from the group consisting of hydroxyl, amino, $C_{1-6}$ alkyl, aryl, a halogen atom selected from the group consisting of F, Cl, Br, and I, and a hydrogen atom.

10. A method of making an electrode active composition, the method comprising:
providing a plurality of first particles of lithium cobalt oxide having a formula of $Li_xCo_yM^1_{(1-y)}O_2$, wherein x satisfies 0.95≤x≤1.05, y satisfies 0.8≤y≤1, and $M^1$ is selected from the group consisting of Zr, Mg, Ti, Sr, W, Nb, Al, P, F, S, and any combination thereof;
providing a plurality of second particles having a core-coating layer structure, wherein providing the plurality of second particles further comprises:
providing a core comprising a ternary material selected from the group consisting of lithium nickel cobalt aluminum oxide, lithium nickel manganese cobalt oxide, or a combination thereof;
providing a coating layer precursor comprising a sulfur-containing compound, wherein the sulfur-containing compound is selected from the group consisting of mercaptan, thiophenol, thioether, thioaldehyde, thioketone, thionocarboxylic acid, sulphoxide, sulfone, sulfur oxoacid, sulfamide, sulfamic acid, lithium bisfluorosulfonimide, thiopropionamide, thioisobutyramide, propylene sulfide, methyl ethyl sulfide, R1-S(=O)$_2$-R2, R1-C(=S)-R2,

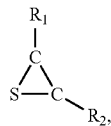

R1-C-S-C-R2, or R1-S(=O)$_2$-LiN-S(=O)$_2$-R2, and any combination thereof, wherein R1 and R2 are each independently selected from hydroxyl, amino, Ci-6 alkyl, aryl, a halogen atom selected from the group consisting of F, Cl, Br, and I, and a hydrogen atom; and
treating the core with the coating layer precursor to form a reaction product as the coating layer on at least a part of a surface of the core, wherein the reaction product comprises Li, S, and O, and S in the coating layer accounts for 400 ppm-5000 ppm in the second particles by weight; and
mixing the plurality of first particles and the plurality of second particles;
wherein the plurality of first particles comprise first lithium cobalt oxide particles with a particle size greater than 11 μm and second lithium cobalt oxide particles with a particle size less than 6 μm, and a ratio in number of the lithium cobalt oxide particles with a particle size greater than 11 μm to the lithium cobalt oxide particles with a particle size less than 6 μm is 0.2-4.8; and
a summed number of the first lithium cobalt oxide particles with a particle size greater than 11 μm and the second lithium cobalt oxide particles with a particle size less than 6 μm accounts for above 90% of a total number of particles in the plurality of first particles.

11. The method according to claim 10, further comprising: mixing the first lithium cobalt oxide particles and the second lithium cobalt oxide particles to obtain the plurality of first particles,
wherein a particle size D$_v$50 of the first lithium cobalt oxide particles is 17 μm-21 μm;
a particle size D$_v$50 of the second lithium cobalt oxide particles is 4 μm-8 μm; and
a weight ratio of the first lithium cobalt oxide particles to the second lithium cobalt oxide particles is 3:1 to 15:1.

12. The method according to claim 10, wherein the core further comprises an alkaline lithium-containing compound on the surface of the core, and the reaction product is formed by a reaction of the alkaline lithium-containing compound and the sulfur-containing compound of the coating layer precursor.

13. The method according to claim 10, wherein the coating layer precursor further comprises a neutral or acidic lithium-containing compound.

14. The method according to claim 10, wherein treating the core with the coating layer precursor further comprises:
applying, on the surface of the core, a solution in which the coating layer precursor is dissolved; and
treating the core with the coating layer precursor at a temperature of 80° C.-300° C. for 3 h-20 h.

15. An electrode, wherein the electrode comprises the electrode active composition according to claim 1.

16. A battery, wherein the battery comprises the electrode active composition according to claim 1.

17. An apparatus, wherein the apparatus comprises the battery according to claim 16, and the battery serves as a power supply unit or an energy storage unit of the apparatus; and
the apparatus is an electric apparatus, and the battery is configured to supply power to the electric apparatus.

18. The method according to claim 10, wherein the coating layer precursor further comprises a fluorine-containing compound, the reaction product further comprises F, and F accounts for 200 ppm-1500 ppm in the second particles by weight.

19. The method according to claim 10, wherein the coating layer precursor further comprises a phosphor-containing compound, the reaction product further comprises P, and P accounts for 500 ppm-3000 ppm in the second particles by weight.

* * * * *